(12) United States Patent
Gwyther

(10) Patent No.: US 7,163,453 B1
(45) Date of Patent: Jan. 16, 2007

(54) DEHIDER WITH DUAL COUNTERBALANCE DRIVE SYSTEM

(75) Inventor: Peter Gwyther, Madison, CT (US)

(73) Assignee: Jarvis Products Corporation, Middletown, CT (US)

( * ) Notice: Subject to any disclaimer, the term of this patent is extended or adjusted under 35 U.S.C. 154(b) by 0 days.

(21) Appl. No.: 11/238,320

(22) Filed: Sep. 29, 2005

(51) Int. Cl.
*A22B 5/16* (2006.01)

(52) U.S. Cl. .................................................. 452/132

(58) Field of Classification Search ............... 452/132, 452/133, 125, 135, 137, 164; 30/276, 347, 30/286, 388, 389, 390, 355, 216, 219, 351, 30/165, 215, 371, 372
See application file for complete search history.

(56) References Cited

U.S. PATENT DOCUMENTS

| | | | | |
|---|---|---|---|---|
| 4,368,560 A | * | 1/1983 | Wetzel et al. ............... | 452/133 |
| 4,901,400 A | * | 2/1990 | Karubian .................... | 452/133 |
| 5,122,092 A | * | 6/1992 | Abdul ......................... | 452/133 |
| 5,311,664 A | * | 5/1994 | Abdul ......................... | 30/276 |
| 5,441,445 A | * | 8/1995 | Karubian et al. ........... | 452/133 |
| 5,551,156 A | * | 9/1996 | Elmer ......................... | 30/276 |

OTHER PUBLICATIONS

*JARVIS Model JC IIIA Air Powered Dehider*, Jarvis Products Corporation, 33 Anderson Road, Middletown, CT 06457-4926, Maintenance Instruction Booklet, pp. 1-12.

* cited by examiner

*Primary Examiner*—Thomas Price
(74) *Attorney, Agent, or Firm*—DeLio & Peterson, LLC

(57) ABSTRACT

A counterbalanced handheld dehider includes a pair of cutting disks driven in opposed cutting oscillations by a motor through an eccentric shaft turned by the motor. Two pushrods, one for each cutting disk, are connected between the eccentric shaft and respective cutting disks. The dehider is dynamically counterbalanced by a first counterbalance mass located on one side of the pushrods and a second counterbalance mass located on the opposite side of the pushrods from the first counterbalance mass. The counterbalance masses are located close to the plane of the pushrods. The invention also includes the counterbalanced eccentric shaft with an integrated first counterbalance mass, and a counterbalance cup with an integrated counterbalance mass.

12 Claims, 4 Drawing Sheets

DEHIDER WITH DUAL COUNTERBALANCE DRIVE SYSTEM

BACKGROUND OF THE INVENTION

1. Field of the Invention

The present invention relates to handheld dehiders and powered skinning knives used to remove the hide of a carcass in a meat processing facility. More specifically, the present invention relates to reducing the vibration of dehiders that use a pair of cutting disks driven in opposed cutting oscillations.

2. Description of Related Art

Handheld dehiders are used in processing facilities to remove the hide from an animal carcass. The most common type of dehider includes a pair of adjacent cutting disks or blades that are driven in opposed cutting oscillations by a corresponding pair of pushrods. The basic design is shown in U.S. Pat. No. 5,122,092 assigned to Jarvis Products Corporation, the assignee of the present invention. Similar dehider designs are shown and described in U.S. Pat. Nos. 4,368,560, 3,435,522 and 2,751,680.

In the dehider design described in the patents above, each cutting blade includes teeth around its perimeter. The adjacent disk blades are driven in opposed cutting oscillations by a pair of pushrods connected to an eccentric drive mechanism operated by a pneumatic motor mounted in the handle of the tool.

The motor rotates a pinion gear, which turns a main drive gear oriented at ninety degrees to the axis of the motor. The main drive gear turns the eccentric shaft to oscillate the pushrods. During each oscillation, the teeth on one disk blade move past the teeth on the adjacent and oppositely moving disk blade. This produces a shearing and cutting action that quickly removes the hide from the carcass.

Although this dehider design has proven effective, the oscillating nature of the eccentric-driven pushrods and blades results in substantial vibration. A known method of reducing this vibration is to use a counterbalance mass on the main drive gear, however, this solution is only partly effective. In order to avoid interference with the oscillating pushrods, the main drive gear and any counterbalance mass connected thereto must be vertically offset from the plane of the pushrods. The offset between the moving mass of the pushrods and the oppositely moving mass of the counterbalance on the main drive gear produces a wobbling motion.

Initially, the magnitude of this wobbling motion is quite limited and the tool can be used comfortably for long periods of time. However, over time, the wobbling motion produces significant excess wear. As the bearings and moving parts begin to wear, the wobble increases in amplitude until it produces an extremely objectionable vibration. Moreover, the wear produced by this motion shortens the lifetime of the component parts in the tool.

Bearing in mind the problems and deficiencies of the prior art, it is therefore an object of the present invention to provide a handheld dehider with less vibration that can be comfortably used for long periods of time.

It is another object of the present invention to provide a handheld dehider that wears less rapidly due to reduced vibration.

A further object of the invention is to provide a counterbalanced eccentric shaft for a handheld dehider with an integrated counterbalance mass.

It is yet another object of the present invention to provide a counterbalance cup for a handheld dehider with an integrated counterbalance mass.

Still other objects and advantages of the invention will in part be obvious and will in part be apparent from the specification.

SUMMARY OF THE INVENTION

The above and other objects, which will be apparent to those skilled in the art, are achieved in the present invention which is directed to a dynamically counterbalanced handheld dehider. The dehider includes a pair of cutting disks, a drive mechanism for driving the cutting disks in opposed cutting oscillations, and a motor mounted in a housing. The drive mechanism includes an eccentric shaft, a main drive gear connected to rotate the eccentric shaft, a pair of pushrods, and first and second counterbalance masses located on opposite sides of the pushrods.

Each pushrod is connected between the eccentric shaft and a respective cutting disk. By positioning the counterbalance masses on opposite sides of the pushrods, the counterbalance masses cooperate to provide counterbalancing acting at a location between the counterbalance masses and opposite the eccentrically driven mass of the pushrods to provide effective dynamic counterbalancing of the dehider.

In one aspect of the invention, the first counterbalance mass is formed as an integral part with the eccentric shaft. The second counterbalance mass may be formed as an integral part with the main drive gear, or, more preferably, it may be formed as separate piece comprising a counterbalance cup that is located closer to the pushrods and the eccentric than the main drive gear. The counterbalance cup includes a shaft opening extending completely through the counterbalance cup and a cup opening that engages the eccentric shaft to prevent rotation of the second counterbalance mass relative to the eccentric shaft.

The dual counterbalance design is preferably implemented in a dehider design in which the housing has a removable blade cover and a removable drive cover and the drive mechanism is removable without removing the motor when the blade cover and drive cover are removed.

The invention is also directed to a counterbalanced eccentric shaft for a handheld dehider having a housing, a pair of cutting disks, a main drive gear operated by a motor and a pair of pushrods driven by the motor through the main drive gear to move the cutting disks in opposed cutting oscillations. The counterbalanced eccentric shaft includes a first cylindrical shaft portion for insertion into a first bearing in the dehider housing, a gear shaft portion for receiving the main drive gear, and an eccentric shaft portion for driving the pair of pushrods. The first counterbalance mass is integrally formed as a single piece with the eccentric shaft and a second cylindrical shaft portion turns within a second bearing in the dehider housing. The first and second cylindrical shafts and the gear shaft are all axially aligned and the eccentric shaft is axially offset therefrom.

The invention is further directed to a counterbalance cup for a handheld dehider of the type described above. The counterbalance cup includes a shaft opening extending through the counterbalance cup and defining an axis of rotation for the counterbalance cup, a counterbalance mass offset to a first side of the axis of rotation, and a cup opening extending partially through the counterbalance cup and having a center offset to a second side of the axis of rotation opposite the first side.

The cup opening is sized to engage the eccentric shaft portion of the eccentric shaft to prevent rotation of the counterbalance mass relative to the eccentric shaft.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1–8 of the drawings in which like numerals refer to like features of the invention.

Figure 1:
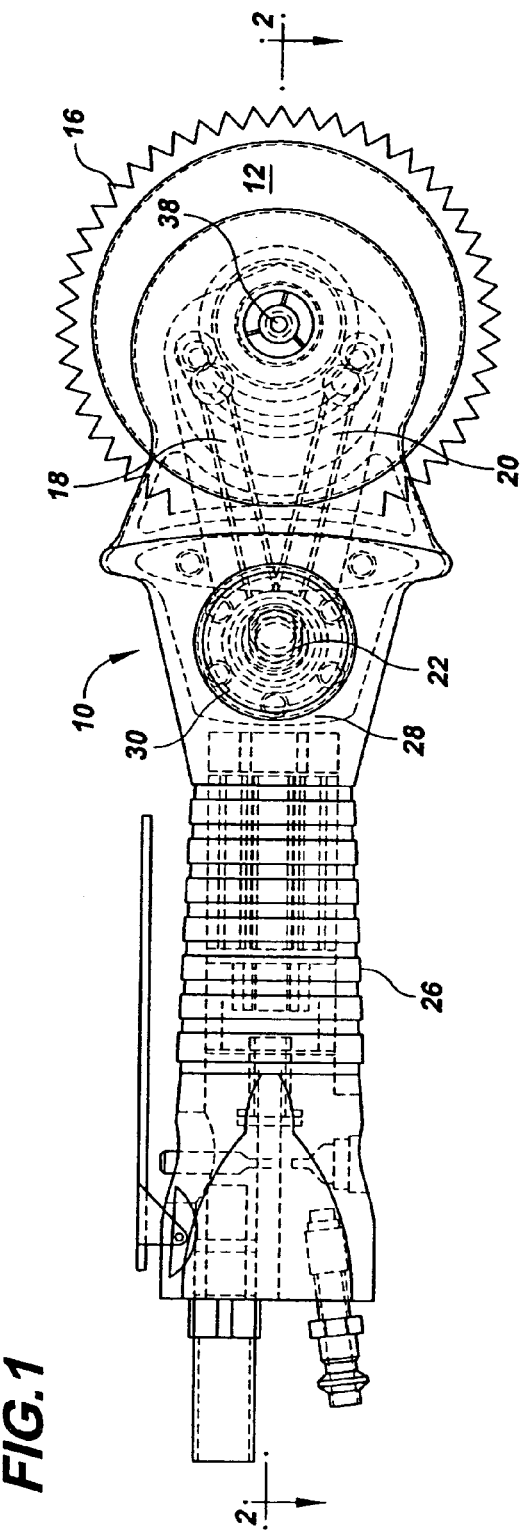
FIG. 1 is a top plan view of a first embodiment of a dehider according to the present invention. Internal components of the dehider are shown in phantom.
Figure 2:
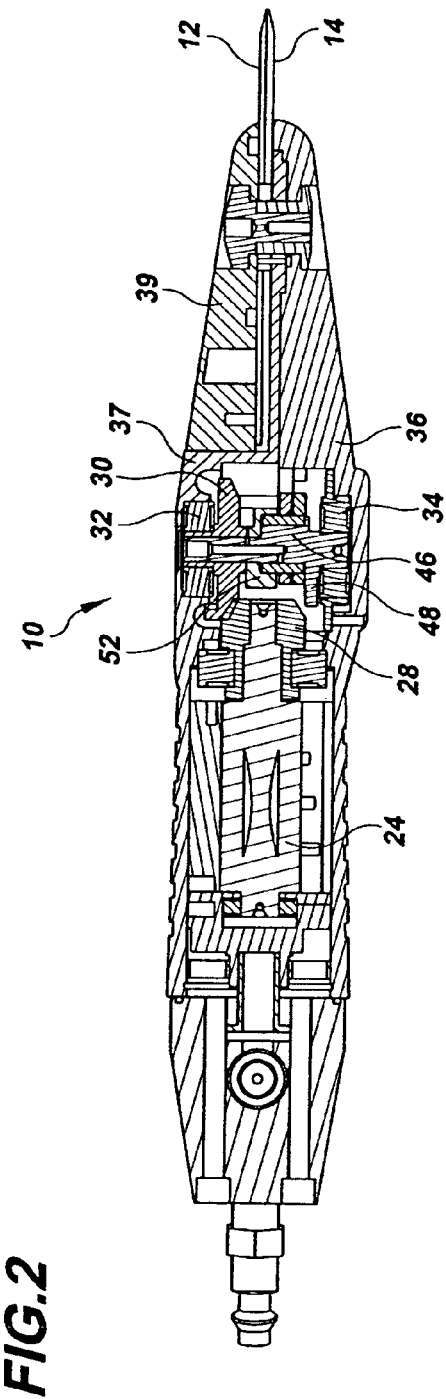
FIG. 2 is a right side elevational view of the first embodiment of the dehider of the present invention, taken in cross section along the line 2—2 in FIG. 1.

FIGS. 1 and 2 show a handheld dehider 10 according to a first embodiment of the present invention. The dehider 10 includes a pair of adjacent cutting disks 12 and 14 having teeth 16 located around the perimeter of each disk. The cutting disks 12, 14 are driven by a pair of pushrods 18, 20 in opposed cutting oscillations by an eccentric shaft 22 (seen best in FIG. 3).

The eccentric shaft 22 is driven by pneumatic motor 24 located in the handle 26 of the tool housing. The motor 24 drives pinion gear 28, which engages and turns the main drive gear 30. The main drive gear 30 is mounted on the eccentric shaft 22 such that rotation of the motor and pinion gear turns the main drive gear and eccentric shaft to drive the pushrods and cutting disks.

The eccentric shaft 22 is held between a pair of bearings 32, 34 mounted in the housing 36 of the dehider. The housing includes the handle 26 at the back of the tool and a forward end of the tool that wraps around and below the drive area and extends underneath the cutting disks. The housing also includes a drive mechanism cover 37 that extends over the drive area and immediately below the cutting disks, and a blade cover 39 located above the cutting disks. The housing design allows easy cleaning and removal of the drive mechanism without removing the motor.

The pushrods 18, 20 are driven by the eccentric shaft such that the back ends of the pushrods are concentrically engaged by the eccentric and move in a circle as the eccentric shaft turns. The front ends of the pushrods move forwards and backwards approximately parallel to the axis of the dehider tool. The moving front ends are connected to the cutting disks 12, 14, one pushrod to each disk.

Each pushrod extends to an opposite side of the central blade shaft 38 and connects to its associated cutting disk on its respective side of the blade shaft. As each pushrod moves forward, it turns the cutting disk it is connected to in the opposite direction from the cutting disk being driven by the other pushrod on the opposite side of the central blade shaft 38. This produces the opposed cutting disk oscillations of this tool.

During each cutting oscillation the teeth 16 on blade 12 pass by the oppositely moving teeth on adjacent cutting disk 14. As the eccentric shaft continues to rotate, the pushrods 18, 20 are drawn back and the direction of motion of the cutting disks 12, 14 is reversed. This causes the cutting teeth 16 on one blade to again pass by the oppositely moving teeth on the other blade to produce a scissors-like action between the oppositely moving teeth that quickly and effectively allows the dehider operator to remove the hide of the carcass.

The above description of components and their operation substantially applies to all handheld dehiders of this basic design. A more detailed description of operation and the advantages of the housing design can be found in U.S. Pat. No. 5,122,092, assigned to Jarvis Products Corporation, the assignee of the present invention, the disclosure of which is incorporated herein by reference.

From the description above, it will be understood that all hand-held dehiders of this basic design are subject to a vibration resulting from the oscillating mass of the pushrods and blades being driven by the eccentric drive system. During each rotation of the eccentric shaft, the two pushrods are driven forward and back, and the disk blades are accelerated in a first direction, then stopped and accelerated in the opposite direction.

A known method of reducing this vibration is to provide a counterbalance mass on the main drive gear 30. The counterbalance mass on the main drive gear (which is located in the drive section near the top of the tool in FIG. 2) is arranged so that it is moving back (towards the handle of the tool) as the eccentric portion of the eccentric shaft (located in the drive section near the bottom of the tool in FIG. 2) is moving the two pushrods forward (towards the cutting disks on the working end of the tool).

The principal difficulty with this method of vibration reduction resides in the fact that it does not provide true dynamic counterbalancing for the dehider. To provide clearance for the pushrods, and to allow the drive mechanism to be removed without removing the motor, the main drive gear must be located above the axis of the motor—in a plane that is well above the plane of the oscillating mass of the pushrods. Consequently, as the pushrods are being driven forward by the eccentric, there is a backwards reaction force that is applied low in the drive section of the tool (where the eccentric and pushrods are located). Simultaneously, the counterbalance mass on the main drive gear is moving backwards, but this produces a forward reaction force that is applied high in the drive section of the tool, where the main drive gear must be located.

Although the forces produced by the counterbalance and the moving masses are in the opposite direction, because they are not aligned in the same plane, they do not cancel completely. The force low in the tool's drive section from the moving masses and the force high in the drive section produce a reinforcing torque on the tool that reverses direction with each oscillation of the blades. The result is that in prior art tools, even tools with drive gear counterbalancing, the tool is not dynamically counterbalanced and a wobbling motion is imparted that produces significant wear on the tool's drive components.

Initially the wobbling motion is relatively small, but as the bearings and pushrods begin to wear, the level of vibration and the wobbling motion increases rapidly to objectionable levels. The present invention addresses this problem by providing two counterbalance masses located on opposite sides of the plane of the pushrods. The two counterbalance masses cooperate to provide counterbalancing which acts at a location between the counterbalance masses and directly opposite and in the same plane as the oscillating mass of the pushrods.

In the preferred embodiment of this invention, the counterbalance mass above the plane of the pushrods is removed from the main drive gear and is shifted onto a separate counterbalance cup 54 (see FIGS. 4–6) that also acts as a spacer. By removing the counterbalance mass from the main drive gear, it can be moved closer to the plane of the pushrods, which reduces the torque produced and the resulting wobbling motion. In addition, the cost of manufacturing the complex main drive gear is substantially reduced.

Figure 3:
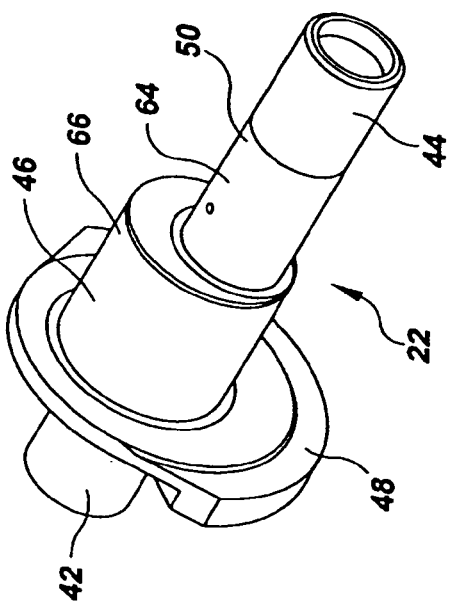
FIG. 3 is a perspective view of an eccentric with an integrated first counterbalance according to the present invention as seen in FIGS. 1 and 2.

FIG. 3 shows an eccentric shaft according to the present invention used in the preferred dehider design of FIGS. 1 and 2. The eccentric shaft 22 includes first and second cylindrical shaft sections 42, 44 which fit into bearings 34 and 32, respectively. The eccentric shaft portion 46 is centrally located and cylindrical bearings on the rear ends of the pushrods fit onto the eccentric shaft portion 46. Adjacent to the eccentric shaft portion 46 is a first counterbalance mass 48. It will be noted that the first counterbalance mass 48 is substantially on the opposite side of the shaft 22 from the eccentric portion 46. Thus, when the pushrods are moving toward the front of the tool in FIGS. 1 and 2, the counterbalance mass 48 will be moving toward the back of the tool.

It will also be seen that the counterbalance mass 48 is extremely close to the eccentric shaft section 46. Accordingly, even without the second counterbalance mass on the counterbalance cup 54, the location of the first counterbalance mass 48 close to the plane of the pushrods improves counterbalancing as compared to the offset location of the prior art on the main drive gear.

The main gear 30 is mounted on the eccentric shaft 22 on a gear shaft portion 50 adjacent to the bearing shaft portion 44.

In order to provide true dynamic counterbalancing, the counterbalancing mass should be located directly opposite the eccentric approximately in the plane of the pushrods 18, 20. However, this location would produce interference between the counterbalance mass and the pushrods as the pushrods move to the rear of the tool and the counterbalance mass must move to the front of the tool. Accordingly, a second counterbalance mass 52 is located on the opposite side of the eccentric and the pushrods from the first counterbalance mass 48 such that the effective counterbalancing mass acts at a point between the first and second counterbalancing masses.

Figure 5:
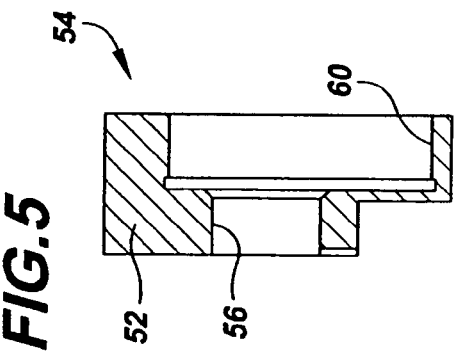
FIG. 5 is a bottom plan view of the second counterbalance seen in FIG. 4.
Figure 4:
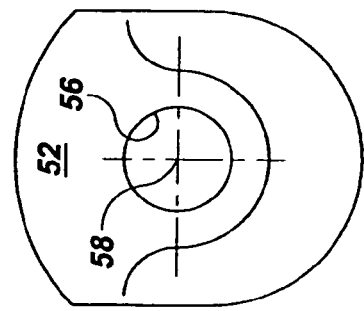
FIG. 4 is a top plan view of a second counterbalance according to the present invention as seen in FIGS. 1 and 2.
Figure 6:
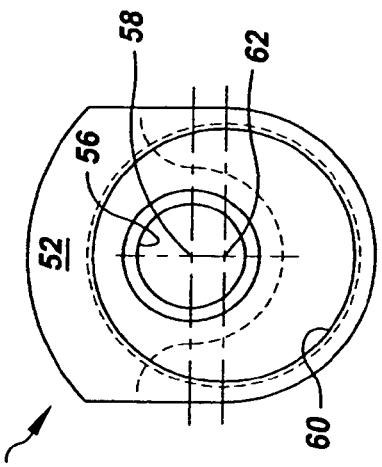
FIG. 6 is a side elevational view of the second counterbalance seen in FIG. 4.

In the preferred design, the second counterbalancing mass is integrated into the counterbalance cup 54 seen in FIGS. 4, 5 and 6. The counterbalance cup 54 includes a shaft opening 56 that extends completely through the counterbalance cup and defines an axis of rotation 58 for the counterbalance cup. The second counterbalance mass 52 is offset to one side of the axis of rotation 58 and a cup opening 60 that extends only partially through the counterbalance cup has a center 62 (see FIG. 6) that is offset in the opposite direction from the counterbalance mass 52.

As may be seen by comparing FIGS. 3 and 6 to the cross sectional view in FIG. 2, the counterbalance cup 54 slides onto the eccentric shaft 22. Shaft opening 56 matches the diameter of the eccentric shaft in the region 64 while the cup opening 60 is sized to receive and engage the eccentric portion of the shaft 46 in the region marked with reference number 66. Because the center 62 of the cup opening 60 is offset from axis 58, the engagement between the cup opening 60 and the eccentric shaft portion 46 acts to prevent the counterbalance mass 52 from rotating relative to the eccentric shaft 22. The second counterbalance mass 52 always remains on the same side of the shaft 22 as the first counterbalance mass 48, and that side is always opposite the side of the shaft from the eccentric 46.

This dual counterbalance design produces an effective dynamic counterbalancing that acts substantially opposite to the masses being driven by the eccentric motion and eliminates the wobbling motion described above. The result is to significantly reduce wear, extend the life of the drive components and increase the time the tool can be used without operator fatigue.

It should be noted that the present invention is directed not only to the dual counterbalance dehider design of FIGS. 1 and 2, but also to the individual drive components for a hand held dehider comprising the eccentric shaft of FIG. 3 with the integrated counterbalance 48 and the counterbalance cup seen in FIGS. 4, 5 and 6 with the integrated counterbalance mass 52.

The design illustrated in FIGS. 1–6 allows the counterbalancing masses 48 and 52 to be extremely close to the plane of the pushrods and the moving masses. As a result any remaining imbalance or imbalance from subsequent wear or manufacturing variation results in a very reduced amplitude wobble as compared to prior art counterbalancing designs with a single counterbalance located far from the plane of the pushrods.

Figure 7:
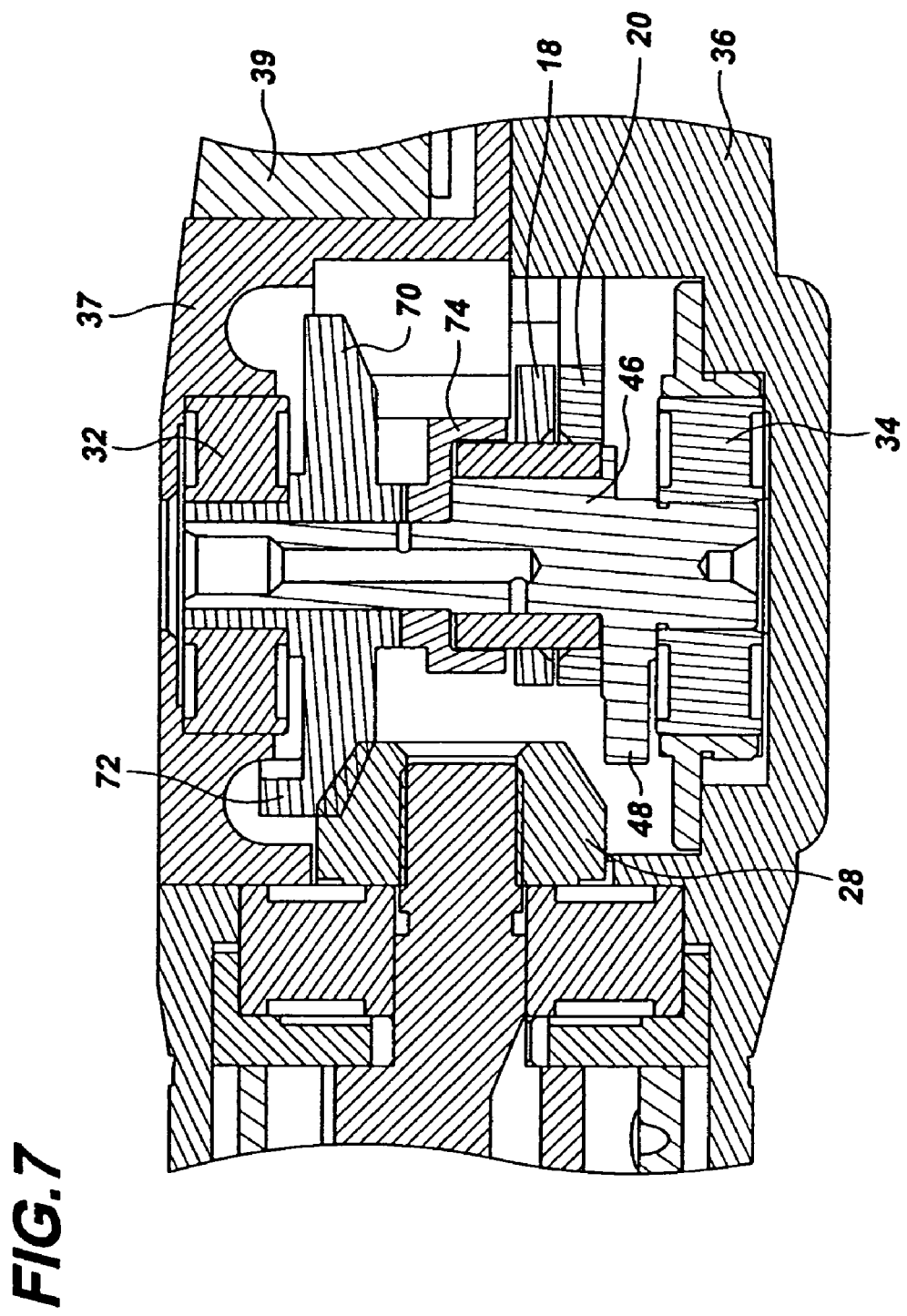
FIG. 7 is a side elevational view, in cross section, of a portion of a second embodiment of a dehider according to the present invention. Only the central portion of the dehider is shown in the vicinity of the drive mechanism and eccentric.

Although the preferred embodiment is seen in FIGS. 1 and 2, an alternative embodiment is seen in FIG. 7 in which one counterbalance remains on the main drive gear, as in the prior art, and a second counterbalance is located on the opposite side of the pushrods on the eccentric shaft. In FIG. 7, only a detailed portion of the drive mechanism is shown. The portion shown substantially corresponds to the central area showing the eccentric shaft 22 in the cross sectional view of FIG. 2.

However, in the design of FIG. 7, the counterbalance cup of FIGS. 4, 5 and 6 is replaced by the prior art counterbalanced main drive gear 70 with an integrated counterbalance mass 72. As can be seen in the enlarged view of FIG. 7, the counterbalance mass 72 is located on one side of the main drive gear 70. The counterbalance cup of FIGS. 4, 5, and 6, which is used in the design of FIGS. 1 and 2, is replaced by a simple spacer cup 74 located between the main drive gear 70 and the eccentric 46. The spacer cup has no counterbalance mass.

In all other respects the embodiment in FIG. 7 corresponds to the embodiment in FIGS. 1–6. Counterbalance mass 48 on the eccentric shaft is located on the opposite side of the pushrods from the counterbalance mass 72 on the drive gear. As in the design in FIGS. 1–6, these two counterbalance masses cooperate to provide dynamic counterbalancing that acts substantially opposite the eccentric 46 in the plane of the pushrod.

Figure 8:
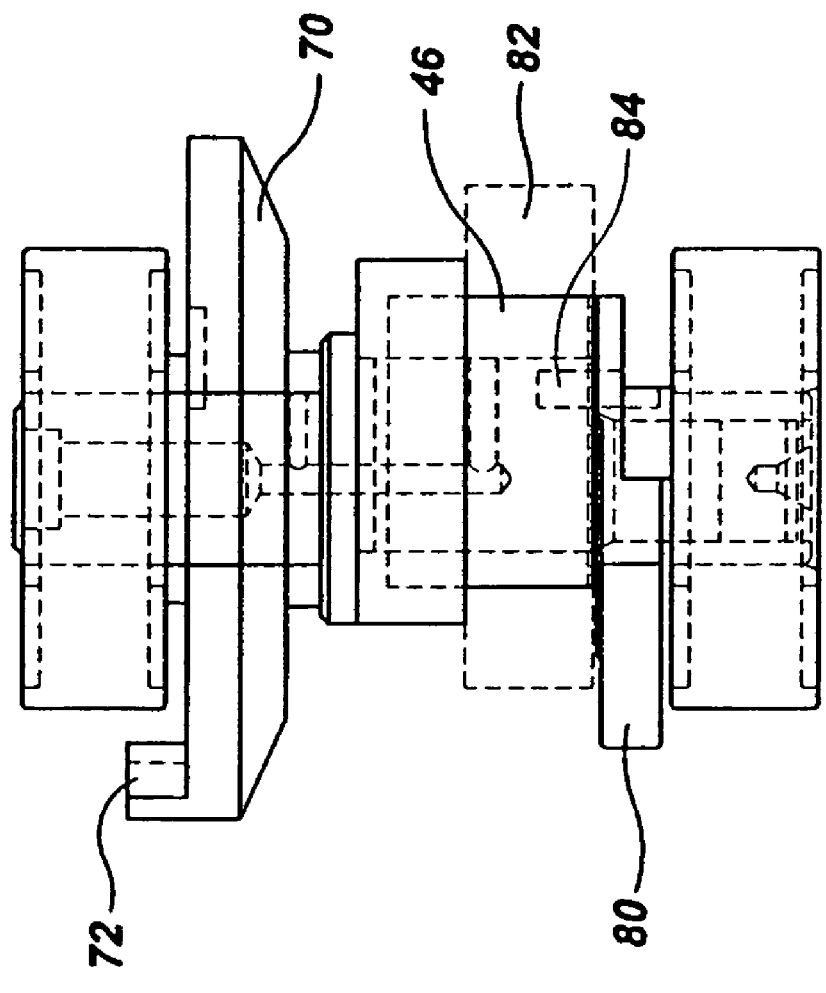
FIG. 8 is a side elevational view of an assembled drive mechanism of a third embodiment of a dehider according to the present invention.

FIG. 8 shows yet another embodiment of the counterbalanced drive mechanism of this invention. In this design, both of the counterbalance masses are entirely separate from the eccentric shaft. The first counterbalance mass 80 is a separate piece located below the eccentric shaft portion 46 where the pushrods are connected (shown in phantom 82). The first counterbalance mass 80 in this design is held in place by a pin 84 to prevent it from rotating around the eccentric shaft. The pin 84 ensures that the first counterbalance mass 80 always remains opposite the offset direction of the eccentric shaft portion 46.

The first counterbalance mass 80 is removable and replaceable by disassembling the drive mechanism of FIG. 8, removing pin 84 and sliding the first counterbalance mass 80 off the end of the eccentric shaft.

The second counterbalance mass 72 is located on the main drive gear, as in the design of FIG. 7, above the eccentric shaft portion 46. The second counterbalance mass 72 is on the opposite side of the rotational axis of the eccentric shaft from the offset eccentric shaft portion 46 and on the same side of that axis as the first counterbalance mass 80.

It will be understood from the various embodiments shown that the first and second counterbalance masses may be formed as part of the eccentric shaft (FIG. 3), as part of the drive gear (FIGS. 7 and 8), or as separate pieces, such as the counterbalance cup (FIGS. 4–6) or the first counterbalance mass 80 (FIG. 8). In each case, one counterbalance mass is located above the plane of the pushrods, and one below that plane so that the vibration due to the eccentrically driven moving mass of the tool is effectively and dynamically counterbalanced.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A handheld dehider comprising:
    a pair of cutting disks;
    a drive mechanism for driving the cutting disks in opposed cutting oscillations including:
        an eccentric shaft;
        a main drive gear connected to rotate the eccentric shaft,
        a pair of pushrods, one for each cutting disk, each pushrod being connected between the eccentric shaft and its respective cutting disk;
        a first counterbalance mass rotated by the main gear, the first counterbalance mass being located on a first side of the pushrods; and
        a second counterbalance mass rotated by the main gear, the second counterbalance mass being located on an opposite side of the pushrods from the first counterbalance mass, the first and second counterbalance masses cooperating to provide counterbalancing acting at a location between the first and second counterbalance masses to provide effective dynamic counterbalancing of the dehider;
    a motor for driving the main drive gear; and
    a housing having the drive mechanism and motor mounted therein.

2. The handheld dehider according to claim 1 wherein the first counterbalance mass is formed as an integral part with the eccentric shaft.

3. The handheld dehider according to claim 1 wherein the second counterbalance mass is formed as an integral part with the main drive gear.

4. The handheld dehider according to claim 1 wherein the first and second counterbalance masses are formed as separate elements from the main drive gear.

5. The handheld dehider according to claim 4 wherein the second counterbalance mass is formed as part of a counterbalance cup, the counterbalance cup having a shaft opening extending completely through the counterbalance cup and a cup opening for engaging the eccentric shaft to prevent rotation of the second counterbalance mass relative to the eccentric shaft.

6. The handheld dehider according to claim 1 wherein the second counterbalance mass is formed as part of a counterbalance cup, the counterbalance cup having a shaft opening extending completely through the counterbalance cup and a cup opening for engaging the eccentric shaft to prevent rotation of the second counterbalance mass relative to the eccentric shaft.

7. A handheld dehider comprising:
    a pair of cutting disks;
    a drive mechanism for driving the cutting disks in opposed cutting oscillations including:
        an eccentric shaft having an eccentric shaft portion between cylindrical shaft portions at each end thereof and an integral first counterbalance mass, the eccentric shaft being mounted in bearings engaging the cylindrical shaft portions at each end of the eccentric shaft;
        a main drive gear mounted on the eccentric shaft and connected to rotate the eccentric shaft,
        a pair of pushrods, one for each cutting disk, each pushrod being connected between the eccentric shaft portion and its respective cutting disk;
        the first counterbalance mass being located on a first side of the pushrods; and
        a counterbalance cup mounted on the eccentric shaft, the counterbalance cup including a second counterbalance mass located on an opposite side of the pushrods from the first counterbalance mass, the first and second counterbalance masses cooperating to provide counterbalancing acting at a location between the first and second counterbalance masses to provide effective dynamic counterbalancing of the dehider;
    a motor for driving the main drive gear; and
    a housing having the drive mechanism and motor mounted therein, the housing including a removable blade cover and a removable drive cover, the drive mechanism being removable without removing the motor when the blade cover and drive cover are removed.

8. A counterbalanced eccentric shaft for a handheld dehider having a housing, a pair of cutting disks, a main drive gear operated by a motor and a pair of pushrods driven by the motor through the main drive gear to move the cutting disks in opposed cutting oscillations, the counterbalanced eccentric shaft comprising:
    a first cylindrical shaft portion for insertion into a first bearing in the dehider housing;
    a gear shaft portion for receiving the main drive gear, and an eccentric shaft portion for driving the pair of pushrods;
    a first counterbalance mass integrally formed as a single piece with the eccentric shaft;
    a second cylindrical shaft portion for insertion into a second bearing in the dehider housing, the first and second cylindrical shafts and the gear shaft being axially aligned, and the eccentric shaft being axially offset therefrom.

9. The drive component for a handheld dehider according to claim 8 further including a counterbalance shaft portion for a second counterbalance mass, the counterbalance shaft portion being located on an opposite side of the eccentric shaft portion from the first counterbalance mass.

10. The drive component for a handheld dehider according to claim 9 wherein the first cylindrical shaft portion, the eccentric shaft portion, the first counterbalance mass, the counterbalance shaft portion for the second counterbalance mass, the gear shaft portion and the second cylindrical shaft portion are formed as a single integrated piece.

11. The drive component for a handheld dehider according to claim 8 wherein the first cylindrical shaft portion, the eccentric shaft portion, the first counterbalance mass, the gear shaft portion and the second cylindrical shaft portion are formed as a single integrated piece.

12. A counterbalance cup for a handheld dehider having a housing, an eccentric shaft including an eccentric shaft portion, a pair of cutting disks, a main drive gear operated by a motor and a pair of pushrods driven by the motor through the main drive gear and the eccentric shaft to move the cutting disks in opposed cutting oscillations, the counterbalance cup comprising:

a shaft opening extending through the counterbalance cup and defining an axis of rotation for the counterbalance cup;

a counterbalance mass offset to a first side of the axis of rotation;

a cup opening extending partially through the counterbalance cup and having a center offset to a second side of the axis of rotation opposite the first side, the cup opening being sized to engage the eccentric shaft portion of the eccentric shaft to prevent rotation of the counterbalance mass relative to the eccentric shaft.

* * * * *